United States Patent
Park

(10) Patent No.: US 10,740,450 B2
(45) Date of Patent: *Aug. 11, 2020

(54) METHOD AND SYSTEM FOR AUTHENTICATING IDENTITY USING VARIABLE KEYPAD

(71) Applicant: HAREX INFOTECH INC., Seoul (KR)

(72) Inventor: Kyung Yang Park, Seoul (KR)

(73) Assignee: HAREX INFOTECH INC., Seoul (KR)

(*) Notice: Subject to any disclaimer, the term of this patent is extended or adjusted under 35 U.S.C. 154(b) by 99 days.

This patent is subject to a terminal disclaimer.

(21) Appl. No.: 15/762,618

(22) PCT Filed: Sep. 23, 2016

(86) PCT No.: PCT/KR2016/010677
§ 371 (c)(1),
(2) Date: Mar. 23, 2018

(87) PCT Pub. No.: WO2017/052277
PCT Pub. Date: Mar. 30, 2017

(65) Prior Publication Data
US 2018/0276366 A1   Sep. 27, 2018

(30) Foreign Application Priority Data
Sep. 23, 2015  (KR) ............ 10-2015-0134518

(51) Int. Cl.
*G06F 21/36*  (2013.01)
*H04L 9/32*  (2006.01)
(Continued)

(52) U.S. Cl.
CPC .......... *G06F 21/36* (2013.01); *G06F 21/32* (2013.01); *H04L 9/0863* (2013.01); *H04L 9/14* (2013.01);
(Continued)

(58) Field of Classification Search
CPC ................ H04L 9/14; H04W 12/06
See application file for complete search history.

(56) References Cited

U.S. PATENT DOCUMENTS 8,302,176 B2   10/2012  Huang
2004/0073809 A1*  4/2004  Wing Keong .......... G06F 21/36
726/7

(Continued)

FOREIGN PATENT DOCUMENTS

JP  2013-101496 A  5/2013
KR  10-2009-0068230 A  6/2009
(Continued)

OTHER PUBLICATIONS

Rajarajan, S., et al. "Shoulder surfing resistant virtual keyboard for internet banking." World Applied Sciences Journal 31.7 (2014): 1297-1304. (Year: 2014).*

(Continued)

*Primary Examiner* — Madhuri R Herzog
(74) *Attorney, Agent, or Firm* — Sughrue Mion, PLLC

(57) ABSTRACT

A server for identity authentication includes a variable keypad generating unit for generating a variable keypad including encryption keys and a signature input part which receives an input of the signature of a user, wherein the position of each of the encryption keys is changed every time the encryption keys are generated; an authentication information saving unit for saving authentication information of a user of a mobile terminal; and an authentication unit for receiving, from the mobile terminal, position information
(Continued)

of the encryption keys according to the order inputted by the user, and signature information inputted by the user on the signature input part, and using same to authenticate identity.

11 Claims, 13 Drawing Sheets

(51) Int. Cl.
  *H04W 12/06* (2009.01)
  *G06F 21/32* (2013.01)
  *H04L 9/08* (2006.01)
  *H04L 9/14* (2006.01)

(52) U.S. Cl.
  CPC .............. *H04L 9/32* (2013.01); *H04L 9/3226* (2013.01); *H04L 9/3247* (2013.01); *H04W 12/06* (2013.01)

(56) References Cited

U.S. PATENT DOCUMENTS

| | | | | |
|---|---|---|---|---|
| 2007/0157299 | A1* | 7/2007 | Hare | G06F 21/36 726/9 |
| 2007/0282974 | A1* | 12/2007 | Nagoshi | H04N 1/00244 709/217 |
| 2009/0260058 | A1 | 10/2009 | Huang | |
| 2011/0191591 | A1* | 8/2011 | Cheng | G06F 21/36 713/182 |
| 2012/0081282 | A1* | 4/2012 | Chin | G06F 3/011 345/156 |
| 2014/0281945 | A1* | 9/2014 | Avni | G06T 1/0021 715/268 |
| 2015/0254667 | A1* | 9/2015 | Ninomiya | G06Q 20/409 705/44 |
| 2015/0310199 | A1* | 10/2015 | Patel | G06F 3/04886 726/30 |
| 2016/0105798 | A1* | 4/2016 | Paima | H04L 63/083 726/7 |
| 2016/0224771 | A1* | 8/2016 | Pike | G07F 7/1033 |
| 2018/0218137 | A1 | 8/2018 | Park | |

FOREIGN PATENT DOCUMENTS

| | | |
|---|---|---|
| KR | 10-2014-0003155 A | 1/2014 |
| KR | 10-2014-0046674 A | 4/2014 |
| KR | 10-1514706 B1 | 4/2015 |
| KR | 10-1535591 B1 | 7/2015 |

OTHER PUBLICATIONS

Notice of Allowance for corresponding KR 10-2015-0134518, dated Dec. 7, 2016.
International Search Report for PCT/KR2016/010677, dated Dec. 19, 2016.
Intellectual Property Office of Singapore: Communication dated May 27, 2019 in application No. 11201802398Q.
European Patent Office: Communication dated Jun. 14, 2019 in application No. 16849002.7.

\* cited by examiner

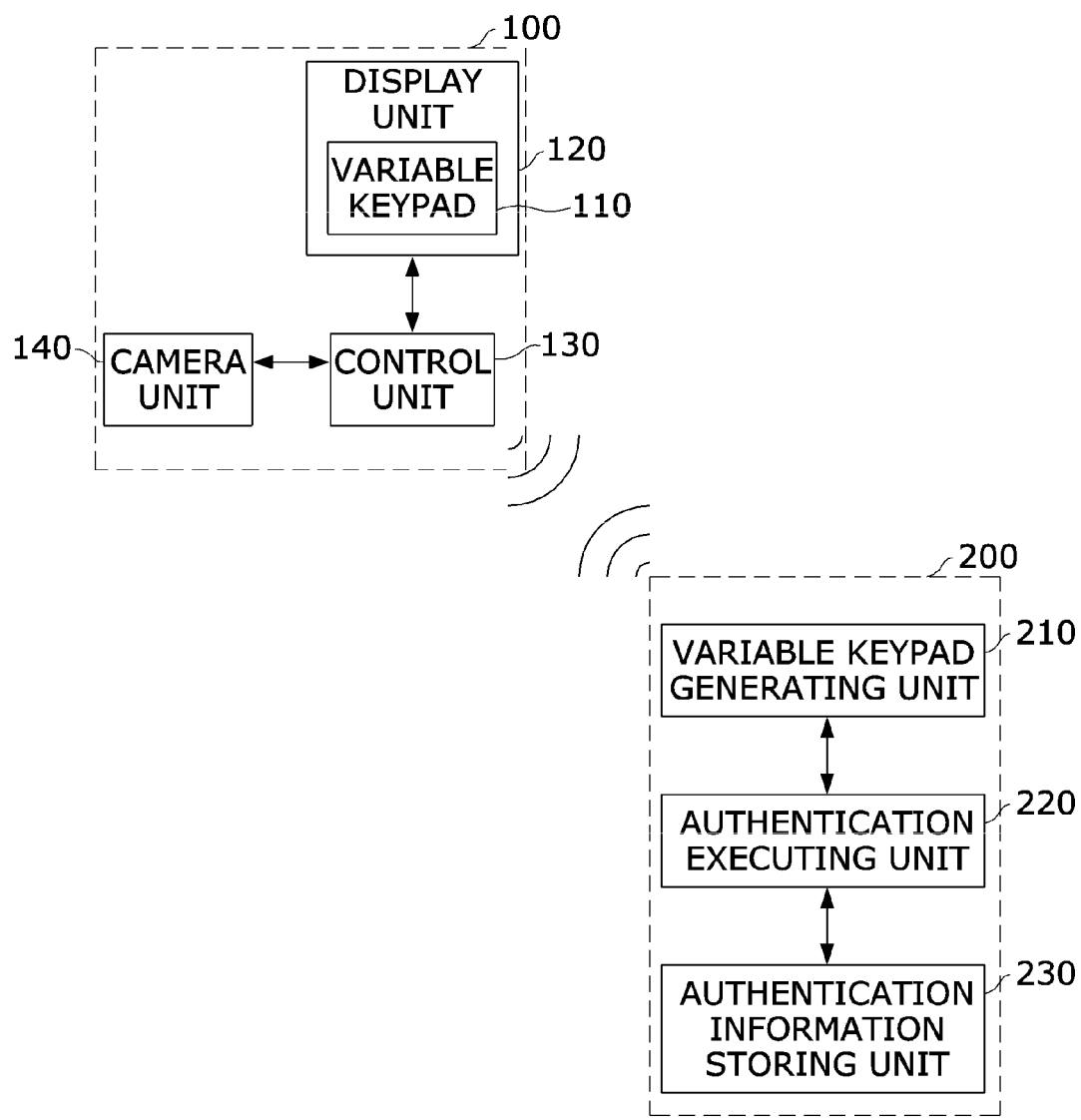

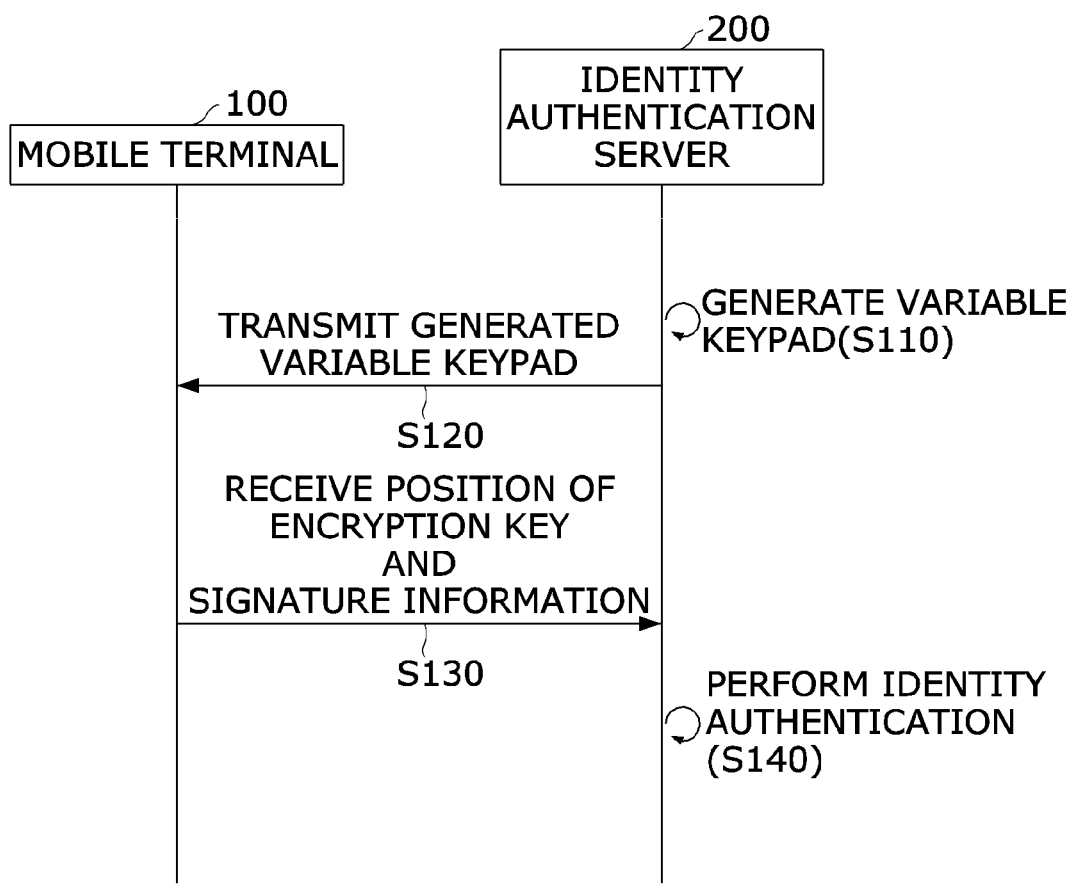

FIG. 3A

| | 1 | 2 | 3 | FIRST TIME |
|---|---|---|---|---|
| 4 | SIGNATURE | 5 | 6 | |
| * | 7 | 8 | # | |
| 9 | CANCEL | CORRECT | 0 | |

FIG. 3B

| | | | | SECOND TIME |
|---|---|---|---|---|
| * | 6 | 7 | 8 | |
| 9 | | 0 | # | |
| CORRECT | 1 | SIGNATURE | 2 | |
| 3 | CANCEL | 4 | 5 | |

METHOD AND SYSTEM FOR AUTHENTICATING IDENTITY USING VARIABLE KEYPAD

TECHNICAL FIELD

The present invention relates to a method and system for identity authentication, and more particularly, to a method and system for identity authentication in which a password and signature information are received through a variable keypad of a mobile terminal, the received password and signal information are transmitted to a server, and identity authentication is performed in the server.

BACKGROUND ART

Recently, with activation of financial transactions, including electronic payment using mobile terminals, such as smart phones and tablet personal computers (tablet PCs), security issues, including passwords, are garnering a large amount of interest.

This is because, in the case of smart phones, different from the existing mobile phones, applications are able to be developed by anyone and the structure is known to everyone, thus having a vulnerability to hacking, similar to PCs that are widely used.

In particular, when a password or resident registration number is input using a fixed keypad, the password or resident registration number may be easily obtained only by finding out a position being touched for the input, and thus users should be cautious in inputting passwords.

A method for compensating for the limitation in using a fixed keypad includes an authentication method using a variable keypad. The variable keypad method operates in such a way that the arrangement of input buttons of the keypad is changed whenever a user uses the variable keypad, so that even when a third party finds out the positions of a password and the like that are input by the user to the keypad, it is not easy for the third party to find out the password using the positions.

However, even in the use of the variable keypad, when the scene of inputting the password is observed, or the password and the like are hacked in the middle of transmission from a mobile terminal to a server at a time of an authentication request, the password itself is subject to discovery, thus there is a limitation in the security against personal information leaks.

In addition, it is also difficult to prevent a third party from performing identity authentication by using the password obtained as described above and deceiving identity.

DISCLOSURE

Technical Problem

The present invention is directed to providing a system and method for preventing a third party from using a password without authorization by transmitting position information of a variable keypad and identity signature information when a password is transmitted from a mobile terminal to an identity authentication server.

The technical objectives of the present invention are not limited to those disclosed above, and other objectives may become apparent to those of ordinary skill in the art on the basis of the following description.

Technical Solution

One aspect of the present invention provides a password and signature information-combined identity authentication server including: a variable keypad generating unit configured to generate a variable keypad including password keys and a signature input part that receives an input of a signature of a user, wherein a position of each of the password keys is changed whenever the variable keypad is generated; an authentication information storing unit configured to store authentication information of a user of a mobile phone; and an authentication executing unit configured to provide a mobile terminal at a remote area with information about the generated variable keypad, receive position information of the password keys according to an order in which the user inputs the password keys and signature information input to the signature input part by the user, and perform identity authentication by using the received position information of the password keys and the received signature information.

Another aspect of the present invention provides an identity authentication mobile terminal including: a display unit including password keys and a signature input part and configured to display a variable keypad that is generated such that a position of each of the password keys is changed whenever the variable keypad is generated; and a control unit configured to receive information about the variable keypad from an identity authentication server, and transfer position information of the password keys, an input order of the password keys, and signature information that are obtained through the variable keypad to the identity authentication sever.

Still another aspect of the present invention provides a password and signature information-combined identity authentication method including: generating a variable keypad including password keys and a signature input part, wherein a position of each of the password keys is changed whenever the variable keypad is generated; providing the generated variable keypad to a mobile terminal; receiving position information of the password keys according to an order in which a user inputs the password keys and signature information input to the signature input part by the user; and performing identity authentication on the basis of the received position information of the password keys and the received signature information.

Advantageous Effects

According to the present invention, position information of a keypad instead of a password itself is transmitted and thus the password cannot be detected through hacking, and signature information is transmitted together with the position information and thus even when the password is disclosed, additional identity authentication is performed using the signature information and thus security can be improved.

DESCRIPTION OF DRAWINGS

FIG. 1 is a block diagram illustrating an authentication system including a mobile terminal and an authentication server according to an embodiment of the present invention.

FIG. 2 is a sequence diagram showing an identity authentication method according to an embodiment of the present invention.

FIG. 3A and FIG. 3B are diagrams illustrating a variable keypad that is changed whenever being generated according to an embodiment of the present invention.

MODES OF THE INVENTION

Figure 4A:
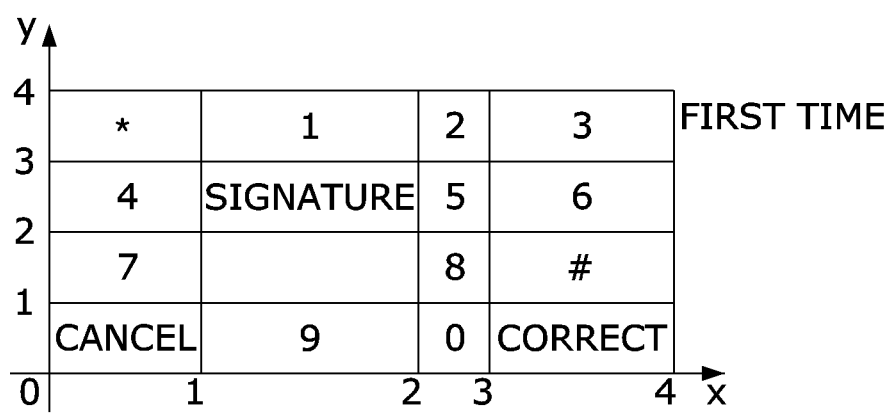
FIG. 4A and FIG. 4B are diagrams illustrating a variable keypad using coordinates on an X-Y plane according to an embodiment of the present invention.
Figure 4B:
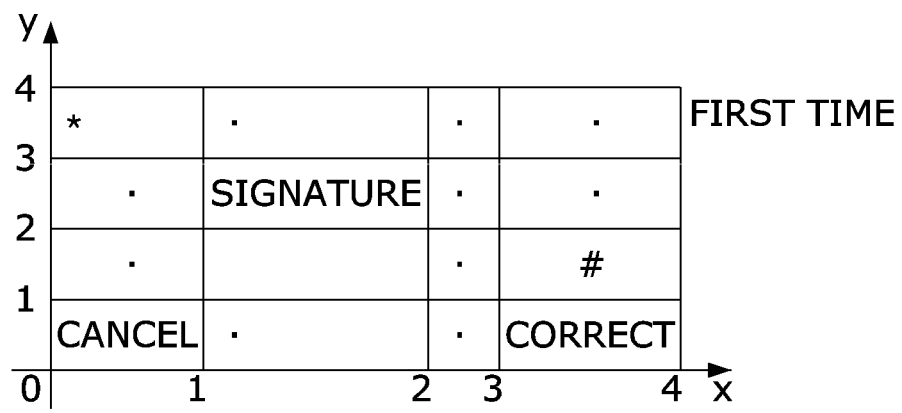

Hereinafter, advantages, features, and ways to achieve them will become readily apparent with reference to descriptions of the following detailed embodiments when considered in conjunction with the accompanying drawings. However, the scope of the present invention is not limited to such embodiments, and the present invention may be realized in various forms. The embodiments to be described below are only embodiments provided to complete the disclosure of the present invention and assist those skilled in the art to completely understand the scope of the present invention. The present invention is defined only by the scope of the appended claims. Meanwhile, terms used herein are used to aid in the explanation and understanding of the present invention and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Hereinafter, exemplary embodiments of the present invention will be described in detail with reference to the accompanying drawings.

FIG. 1 is a block diagram illustrating a password and signature information-combined identity authentication system according to an embodiment of the present invention.

Referring to FIG. 1, the password and signature information-combined identity authentication system includes a mobile terminal 100 and an identity authentication server 200.

The identity authentication server 200 includes a variable keypad generating unit 210, an authentication executing unit 220, and an authentication information storing unit 230.

The variable keypad generating unit 210 generates a variable keypad including password keys and a signature input part such that a position of each of a number key and a text key constituting the password keys is changed whenever the variable keypad is generated. Alternatively, the variable keypad generating unit 210 may allow the position of the signature input part to be changed whenever the variable keypad is generated.

When the authentication executing unit 220 transmits arrangement information of the respective password keys, that is, information about the generated variable keypad, to the mobile terminal 100 at a remote site, the mobile terminal 100 receives authentication information, such as a password, signature information, and the like, from a user using the information about the generated variable keypad.

Instead of the method of generating the variable keypad whenever necessary, the authentication executing unit 220 may use a method in which a plurality of variable keypads are generated in advance, indexes are assigned to the respective variable keypads, and whenever authentication is performed, only the index of the variable keypad is transferred to the mobile terminal 100 while sharing the indexes with the mobile terminal 100.

The authentication executing unit 220 may receive position information of password keys according to the order in which a user inputs the password keys and signature information from the mobile terminal 100, and perform identity authentication on the basis of the position information and the signature information. When the position of the signature input part is also changed, the authentication executing unit 220 receives position information of the signature input part as well in order to use for the identity authentication.

For example, the authentication executing unit 220 performs identity authentication by receiving position information of password keys according to the order in which a user inputs the password keys and signature information from the mobile terminal 100, such as a smart phone. That is, referring to FIG. 4A, when a user consecutively inputs 4, 3, 1, and 2 to a keypad, the authentication executing unit 220 receives position coordinates (0.5,2.5), (3.5,3.5), (1.5,3.5), and (2.5,3.5) of the password keys corresponding to the inputs and signature information, and performs identity authentication on the basis of the received information.

The authentication executing unit 220 stores position information and an input order of password keys corresponding to a password as well as position information of the signature input part whenever a variable keypad is generated, and upon receiving position information of password keys according to an order in which a user inputs the password keys, position information of the signature input part, and signature information from the mobile terminal 100, performs authentication by comparing the received position information of password keys according to the order in which the user inputs the password keys, the position information of the signature input part, and the signature information with the position information of the password keys, the position information of the signature input part, and the signature information that are previously stored.

Assuming that a password is composed of 4, 3, 1, and 2 as described in the above example, position information of password keys corresponding to the password is provided as (0.5,2.5), (3.5,3.5), (1.5,3.5), and (2.5,3.5) according to FIG. 4A, and the input order is the same as that described above. In addition, when the position of the signature input part is changed whenever the variable keypad is generated, the position information of the signature input part is provided as (1.5, 2.5).

The authentication executing unit 220 receives the position information of the password keys corresponding to the password according to the order in which the user inputs the password keys, the input order of the password keys, the position information of the signature input part, and the signature information from the mobile terminal 100, and performs authentication by comparing the received position information of the password keys, input order of the password keys, position information of the signature input part, and signature information with authentication information including position information of the password keys, input order of the password keys, position information of the signature input part, and signature information that are previously stored in the authentication information storing unit 230.

The present invention may adopt a method of recognizing user's handwriting instead of signature information and using the handwriting for the identity authentication.

Since a signature has a fixed pattern, the signature may be imitated by practicing transcription of the signature. However, when a user uses characters that change every time instead of a signature, for example, a given sentence "I love you", "I confirm" "On a wonderful day in October", and the like, it is almost impossible for the characters to be imitated every time, so that security is enhanced.

In order to check the handwriting of a user, previously stored handwriting of the user is compared with handwriting of an input sentence, for example, a decomposition identification method of decomposing characters and comparing common copies in which a composition of strokes, a shape of a stroke, a stroke order, an arrangement of letters, a pen pressure, a stroke of a pen, misspelling, or a misuse is identified is also used.

According to a comprehensive determination of the identification tests, it is distinguished whether a sentence input by a user is written by an identical person or by a different person.

The authentication executing unit 220 generates an example sentence whenever the variable keypad is generated and transmits the example sentence to the mobile terminal 100, and a user inputs a password together with the example sentence, instead of the signature, to the signature input part of the mobile terminal 100.

The mobile terminal 100 transmits the position information of password keys corresponding to the password according to the order in which the user inputs the password keys, the input order of the password keys, and the sentence input by the user to the authentication executing unit 220.

The authentication executing unit 220 performs identity authentication by comparing the sentence input by the user, which is received together with the position information and input order of the password, with handwriting of the user that is previously stored in the authentication information storing unit 230.

The authentication information storing unit 230 stores passwords, signature information, and handwriting information of mobile terminal users.

In addition, the authentication information storing unit 230 stores authentication information including password keys of variable keypads generated by the variable keypad generating unit 210, position information of the password keys, position information of a signature input part of the variable keypad, and signature information.

The mobile terminal 100 may include a display unit 120 including the variable keypad 110 and a control unit 130, and may further include a camera unit 140.

The mobile terminal 100 includes not only a mobile phone but also a smart phone, a cell phone, a tablet PC, a notebook computer, a mobile credit card payment terminal, a bank automatic teller machine (ATM), a kiosk installed in a pharmacy and a government office, Whenever the variable keypad 110 is generated, the position of each of the password keys and the position of the signature input part are changed. The variable keypad 110 is generated by the variable keypad generating unit 210 of the identity authentication server 200, and the variable keypad 110 on the mobile terminal 100 is the variable keypad received from the identity authentication server 200 and displayed.

The display unit 120 displays the variable keypad 110 while changing the position of the password key included in the variable keypad whenever the variable keypad 110 is generated with the position of the signature input part fixed, or with the position of the signature input also changed whenever the variable keypad 110 is generated.

Figure 6A:
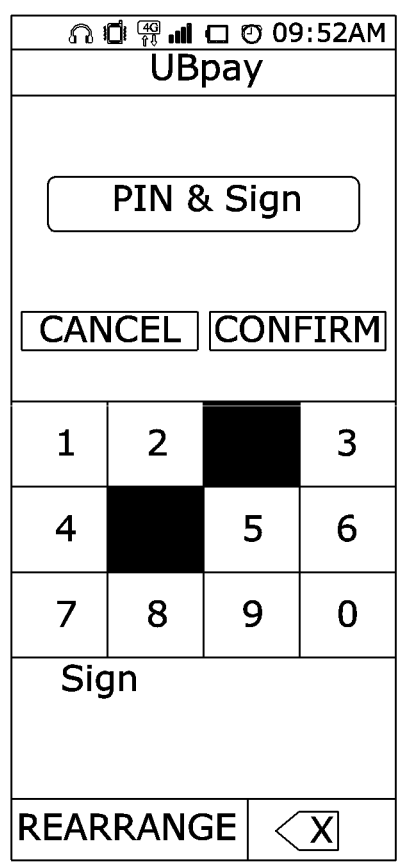
FIG. 6A and FIG. 6B are diagrams illustrating a display unit of a mobile terminal on which a variable keypad and a signature input part are displayed according to an embodiment of the present invention.
Figure 6B:
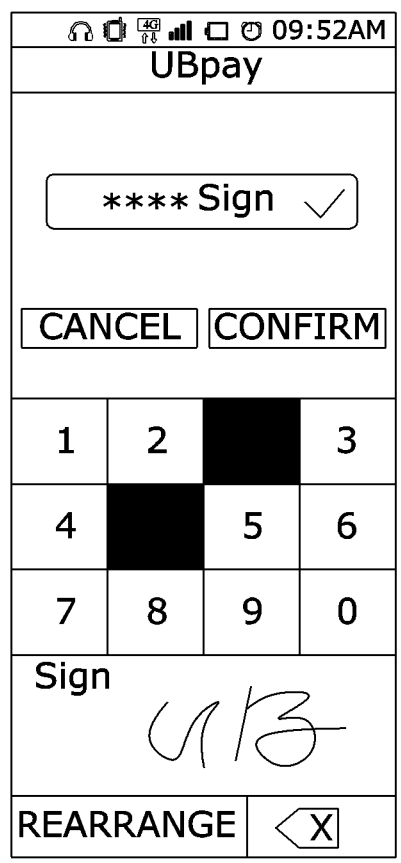

FIG. 6 is a diagram illustrating the display unit 120 on which the variable keypad 110 and the signature input part are displayed. FIG. 6A illustrates the display unit before a user inputs a password and a signature, and FIG. 6B illustrates the display unit after a user inputs a password and a signature. The input password is asterisked for security purposes.

The control unit 130 receives information about the variable keypad from the identity authentication server 200, and transmits position information of password keys input by a user, an input order of the password keys, and position information of the signature input part, and signature information to the identity authentication server 200.

When the above-described handwriting identification method is used for the identity authentication, the control unit 130 transmits, to the identity authentication server 200, a sentence input by a user instead of the signature information.

The mobile terminal 100 may additionally include the camera unit 140. The camera unit 140 captures an image in a direction toward the user. Accordingly, the face of the user who inputs authentication information is used as additional authentication information in addition to the input through the variable keypad 110.

The camera unit 140 captures a facial image of the user by receiving a command of the control unit 130 while the variable keypad 110 is receiving an input from the user. The user may capture a facial image conforming to a guide line of a facial outline displayed on the display unit 120 by adjusting the position of the mobile terminal 100 in accordance with the guide line of the facial outline.

Figure 7A:
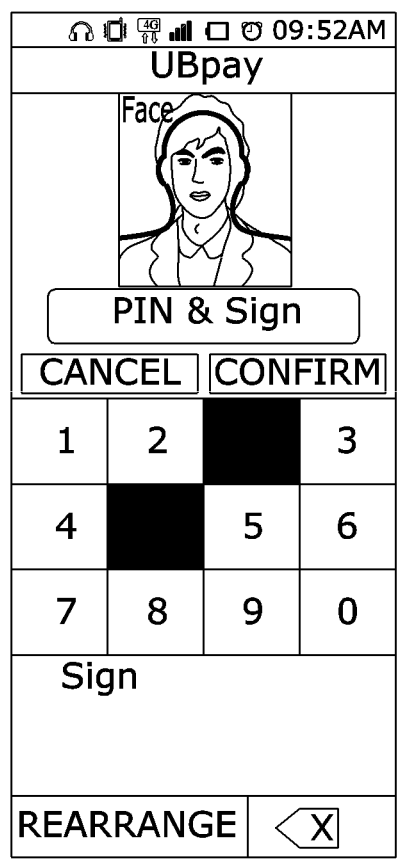
FIG. 7A and FIG. 7B are diagrams illustrating a variable keypad with a facial recognition part added thereto according to another embodiment of the present invention.
Figure 7B:
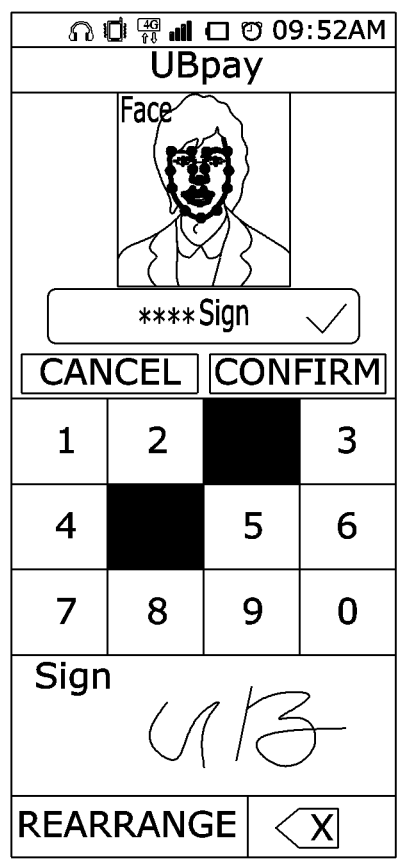

FIG. 7 is a diagram illustrating a process of recognizing the face of a user for a facial recognition together with the variable keypad 110 and the signature input part. When a facial outline is presented and a user conforms his/her face to the facial outline as shown in FIG. 7A, a facial image for facial recognition is captured as shown in FIG. 7B.

The control unit 130 transmits the facial image captured as such to the identity authentication server 200, and the identity authentication server 200 may perform additional authentication using the facial image together with other pieces of authentication information.

FIG. 2 is a sequence diagram showing a password and signature information-combined identity authentication method according to an embodiment of the present invention.

First, a variable keypad including password keys and a signature input is generated such that the position of each of the password keys and the signature input part may be changed whenever the variable keypad is generated (S110).

The variable keypad generated as above is transmitted to the mobile terminal 100 together with generation information (S120), and a user inputs a password and a signature to the variable keypad displayed on the mobile terminal 100.

The identity authentication server 200 receives position information of password keys according to an order in which the user inputs the password keys, position information of the signature input part, and signature information from the mobile terminal 100 (S130), and performs identity authentication on the basis of the position information of the password keys, the position information of the signature input part, and the signature information that are received (S140).

According to another embodiment of the present invention, identity authentication may be performed by only using position information of some of the password keys in performing the identity authentication.

For example, when a password is 4 3 1 2, a user does not input all of the four digits of the password but inputs some of the password, for example, leading two digits 4 and 3, trailing two digits 1 and 2, first and third digits 4 and 1 of the password, and the like.

When the leading two digits 4 and 3 are input, the positions of the password are (0.5, 2.5) and (3.5, 3.5) as shown in FIG. 4A, and identity authentication is performed on the basis of the positions and the input order of the password, the signature information or handwriting information, and the like in performing the identity authentication.

It should be understood that when the mobile terminal 100 includes a camera, facial recognition information of the user may be additionally used for the authentication as described above.

When the identity authentication is performed on the basis of the position information of some of the password keys, the amount of data used to perform the authentication is smaller than that required when the position information of all password keys is used, so that computation speed is improved, and the number of password keys to be input is smaller than that required when the position information of all password keys is used, so that user convenience is improved.

FIG. 3 is a diagram illustrating a variable keypad including password keys and a signature input part according to an embodiment of the present invention, in which the position of each of the password keys and the signature input part is changed whenever the variable keypad is generated. FIG. 3A illustrates the variable key pad that is initially generated, and FIG. 3B illustrates that the position of the password keys and the signature input part is changed when the variable keypad is generated later.

Figure 5:
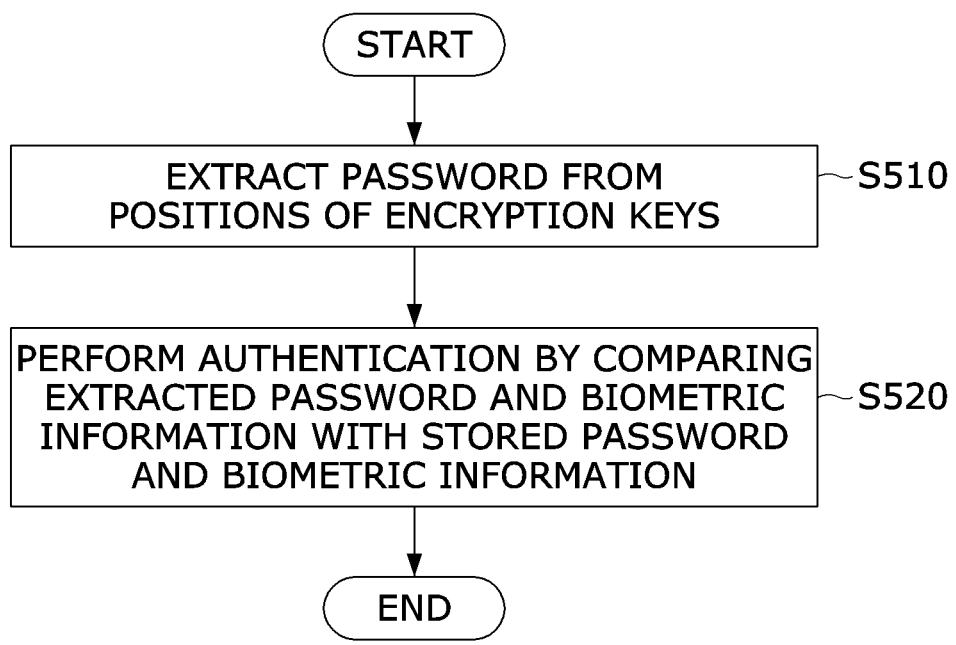
FIG. 5 is a flowchart showing a procedure of performing authentication by extracting a password from password keys according to an embodiment of the present invention.

FIG. 5 is a flowchart showing a procedure of performing identity authentication by extracting a password from the positions of password keys according to an embodiment of the present invention.

A password is previously stored in the identity authentication server, and when position information of a password is received from the mobile terminal, the password is extracted from the received position information and input order of the password, and the extracted password is compared with the password stored in the authentication storing unit, thereby performing identity authentication.

First, the authentication executing unit receives positions of password keys according to an order in which a member inputs the password keys from the mobile terminal, and extracts a password input by the member (S510).

Then, the authentication executing unit compares the extracted password and received signature with the password and signature stored in the authentication information storing unit, thereby performing authentication (S520).

FIG. 7 is a diagram illustrating a process of capturing a facial image of a user and transmitting the captured facial image to the identity authentication server 200 according to another embodiment of the present invention.

The control unit 130 of the mobile terminal 100 controls the camera unit 140 to capture the face of the user in front of the mobile terminal 100, and the camera unit 140 captures a facial image of the user according to a command of the control unit 130.

When the user conforms his/her face to a guide line of the facial outline displayed on the screen as shown in FIG. 7A, the face is recognized together with the password of the variable keypad as shown in FIG. 7B, and are transmitted to the identity authentication server 200, so that identity authentication is performed.

When an illumination is adjusted using a flashlight of the mobile terminal 100 before the camera unit 140 captures the facial image, human eyes are caused to have dilated or constricted pupils in response to the adjusted illumination. Accordingly, as the pupils according to the adjustment of illumination are checked, authentication information is prevented from being fabricated using a facial picture of a user that is previously captured, so that security is enhanced.

Figure 8A:
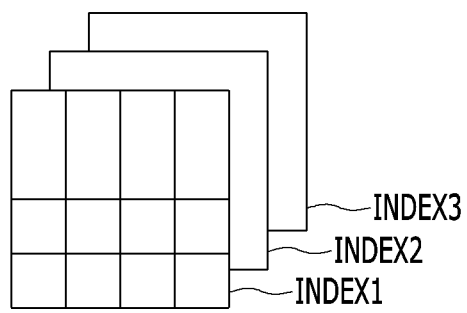
FIG. 8A and FIG. 8B are diagrams illustrating an example in which authentication is performed using an index of a variable pad according to still another embodiment of the present invention.
Figure 8B:
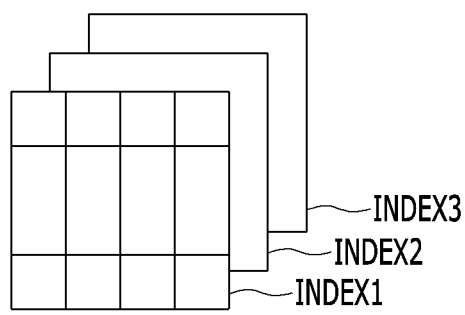

FIG. 8 is a diagram illustrating an example in which primary authentication is performed using an index corresponding to a variable pad according to an embodiment of the present invention. FIG. 8A illustrates indexes assigned to variable keypads stored in the authentication server, respectively, and FIG. 8B illustrates indexes assigned to variable keypads stored in the mobile terminal, respectively.

Referring to FIG. 8, the authentication executing unit generates a plurality of variable keypads and generates indexes corresponding to the plurality of variable keypads. That is, when the identity authentication server generates the variable keypads, indexes 1, 2, and 3 corresponding to variable keypads 1, 2, and 3 are generated, and the generated variable keypads and indexes are transmitted to the mobile terminal.

The authentication server selects one of the stored indexes in response to receiving an authentication request and provides the selected index to the mobile terminal, and the mobile terminal, after receiving the selected index, may select a variable keypad corresponding to the received index and displays the selected variable keypad on the screen.

The authentication server performs secondary authentication by comparing the position information of password keys, the input order and the signature information received from the mobile terminal with the position information of password keys, the input order, and the signature information that are previously stored.

According to the embodiment, a variable keypad arrangement is not transmitted from the authentication server to the mobile terminal, so the variable keypad arrangement is not identified through hacking of a transmission packet, and thus security is improved.

Through the above described user authentication method and apparatus using the variable keypad, signature information, and facial recognition, a user can perform a financial transaction in an environment with improved security, and thus can perform a financial transaction using a mobile terminal and a mobile communication network without concern.

Although exemplary embodiments of the present invention have been described for illustrative purposes, those skilled in the art will appreciate that various modifications, additions and substitutions are possible, without departing from the scope and spirit of the present invention. Accordingly, the scope of the present invention is not to be limited by the above embodiments and is defined by the claims and the equivalents thereof.

REFERENCE NUMERALS

100: mobile terminal
110: variable keypad
120: display unit
130: control unit
140: camera unit
200: authentication server
210: variable keypad generating unit
220: authentication executing unit
230: authentication information storing unit

The invention claimed is:

1. A server for identity authentication, the server comprising at least one hardware processor to implement:
   a variable keypad generating unit configured to generate a variable keypad including password keys and a signature input part that receives an input of a signature of a user, wherein a position of each of the password keys is changed whenever the variable keypad is generated;
   an authentication information storing unit configured to store authentication information of a user of a mobile terminal; and
   an authentication executing unit configured to provide the mobile terminal at a remote site with information about the variable keypad, receive, from the mobile terminal, position information of the password keys, according to an order in which the user inputs the password keys, and signature information input to the signature input part by the user, and perform identity authentication by using the received position information of the password keys and the received signature information,
   wherein respective indexes are assigned to a plurality of variable keypads and the respective indexes are stored in the server, the plurality of variable keypads being stored in the mobile terminal, and
   wherein, in response to receiving an authentication request, the authentication executing unit selects one of the respective indexes stored in the server, corresponding to the variable keypad, and provides the selected index to the mobile terminal, upon which the variable keypad is retrieved by the mobile terminal from the plurality of variable keypads stored in the mobile terminal.

2. The server of claim 1, wherein the variable keypad generating unit generates the variable keypad such that a position of the signature input part is changed whenever the variable keypad is generated.

3. The server of claim 1, wherein the authentication executing unit performs authentication by extracting a password input by the user from the received position information of the password keys and comparing the extracted password and the received signature information with the authentication information that are previously stored in the authentication information storing unit.

4. The server of claim 1, wherein the authentication executing unit is configured to:
   store position information and an input order of password keys corresponding to a password whenever the variable keypad is generated; and
   upon receiving position information of the password keys according to the order in which the user inputs the password keys and the signature information from the mobile terminal, perform authentication by comparing the position information and the input order of the password keys and the signature information with position information and an input order of password keys and signature information that are previously stored in the authentication information storing unit.

5. The server of claim 1, wherein the authentication executing unit is configured to:
   upon receiving an index from the mobile terminal, perform primary authentication by comparing the received index with a previously stored index; and
   when a result of the primary authentication is successful, perform authentication by comparing the position information and the input order of the password keys and the signature information received from the mobile terminal with position information and input order of password keys and signature information that are previously stored in the authentication information storing unit.

6. A mobile terminal for identity authentication, the mobile terminal comprising:
   a display configured to display a variable keypad that includes password keys and a signature input part through which a password and a signature are received, wherein the variable keypad is generated such that a position of each of the password keys is changed whenever the variable keypad is generated; and
   a control unit, implemented by at least one hardware processor, configured to receive information about the variable keypad from a server, and to transfer position information of the password keys, an input order of the password keys, and signature information that are obtained through the variable keypad to an identity authentication server,
   wherein the mobile terminal stores a plurality of variable keypads and respective indexes are assigned to the plurality of variable keypads, and
   wherein, in response to an authentication request transmitted to the server, the control unit receives one of the respective indexes from the server and retrieves the variable keypad corresponding to the received index from the plurality of variable keypads stored in the mobile terminal.

7. The mobile terminal of claim 6, further comprising a camera,
   wherein the control unit controls the camera to capture a facial image of a user in front of the camera and transfer the captured facial image to the server.

8. A method for identity authentication performed by a server, the method comprising:
   generating a variable keypad including password keys and a signature input part, wherein a position of each of the password keys is changed whenever the variable keypad is generated;
   providing information about the generated variable keypad to a mobile terminal;
   receiving position information of the password keys according to an order in which the user inputs the password keys and signature information input on the signature input part by the user; and
   performing identity authentication based on the received position information of the password keys and the received signature information,
   wherein respective indexes are assigned to a plurality of variable keypads and the respective indexes are stored in the server, the plurality of variable keypads being stored in the mobile terminal, and
   wherein the providing comprises, in response to receiving an authentication request, selecting one of the respective indexes stored in the server, corresponding to the variable keypad, and providing the selected index to the mobile terminal, upon which the variable keypad is retrieved by the mobile terminal from the plurality of variable keypads stored in the mobile terminal.

9. The method of claim 8, wherein the generating of the variable keypad includes generating the variable keypad such that a position of the signature input part is changed whenever the variable keypad is generated.

10. The method of claim 8, wherein the performing of identity authentication includes performing authentication based on position information of some of the password keys.

11. The method of claim 8, wherein the performing of identity authentication includes performing authentication by extracting a password input by the user from the position information of the password keys according to the order in which the user inputs the password keys and comparing the extracted password and the received signature information with a password and signature information that are previously stored in an authentication information storing unit.

\* \* \* \* \*